United States Patent Office 3,300,091
Patented Jan. 24, 1967

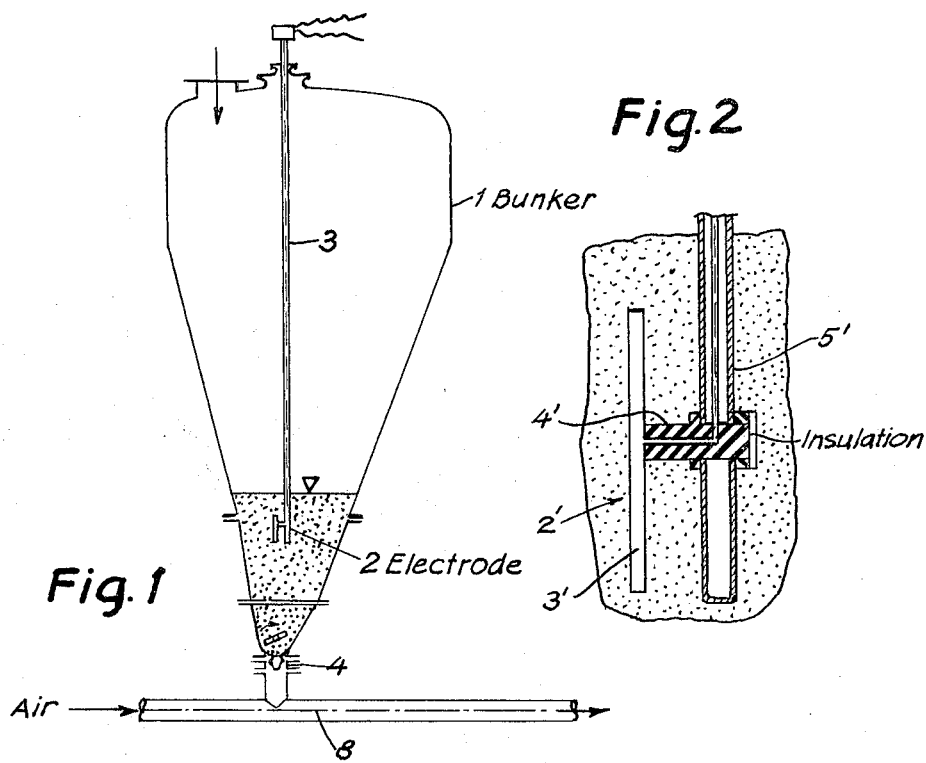
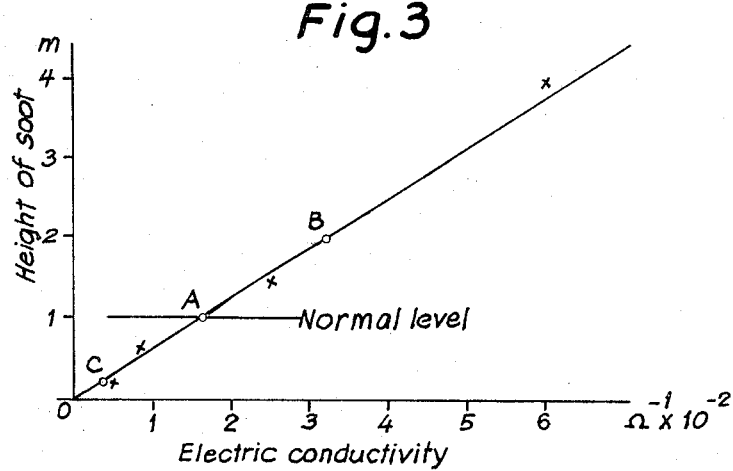

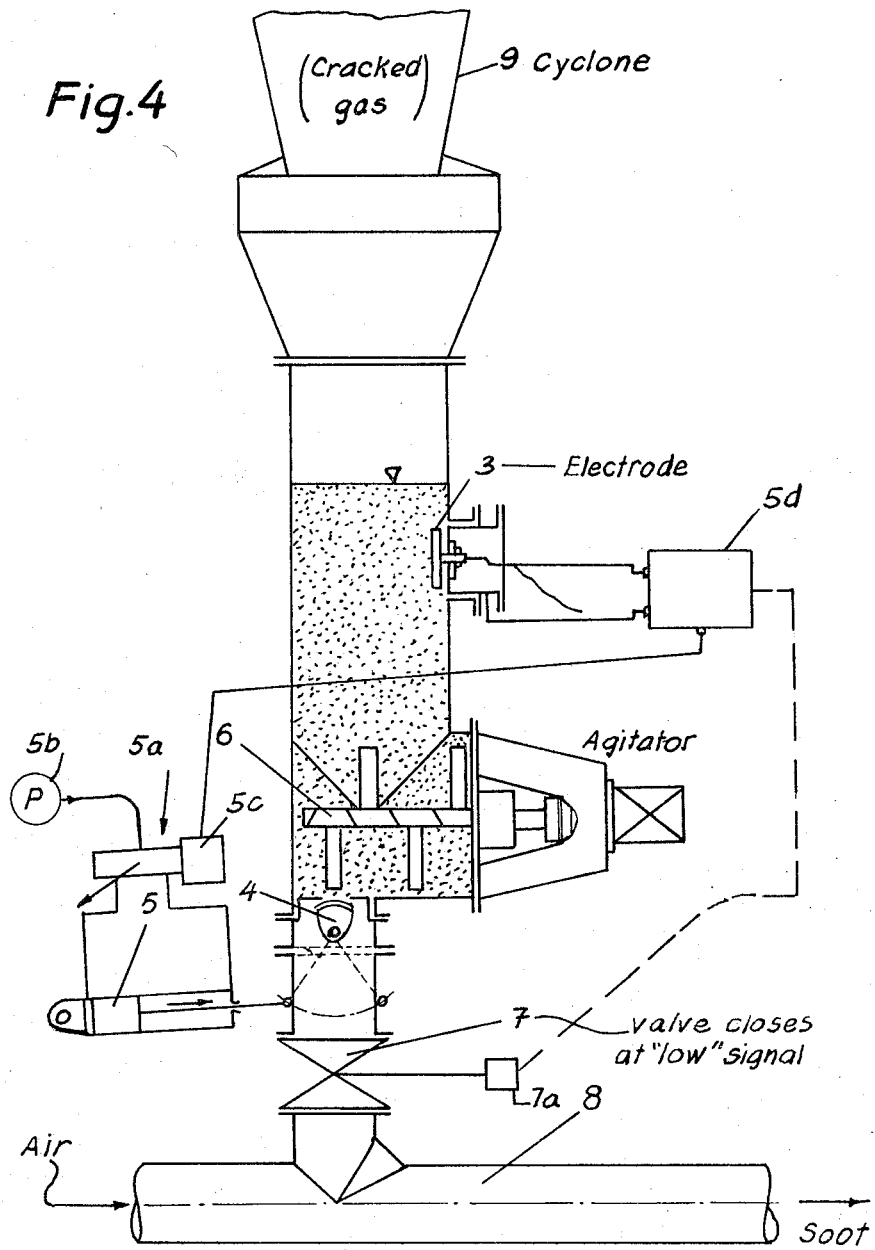

3,300,091
APPARATUS FOR REGULATING THE LEVEL OF SOOT
Gerhard Wondrak and Günther Strohrmann, Marl, Germany, assignors to Chemische Werke Hüls Aktiengesellschaft, Marl, Germany, a corporation of Germany
Filed Apr. 1, 1965, Ser. No. 444,622
Claims priority, application Germany, Apr. 16, 1964, C 32,649
6 Claims. (Cl. 222—1)

The present invention relates to the continuously controlled delivery of soot or carbon black during its collection from burning gases.

Soot produced from the combustion of gas must be separated from the gas and collected and subsequently conveyed to a point of use or treatment prior to use. Because of the nature of the soot, namely, the bulkiness and lightness thereof, problems are encountered in depositing the soot into different kinds of containers, removing it from the containers and controlling it during this operation.

It is usually necessary to make the soot containers gas tight and for this purpose it is common practice to use rotary pocketed valves at the bottoms of the containers for withdrawing the soot from the containers to maintain a gas lock at the point of withdrawal of the soot. Furthermore, relatively narrow passageways are employed leading into the rotary valves and sometimes a plurality of valves and passageways are employed which will leave no more than slight differences in gas pressures encountered throughout the system.

Passageways or chutes of the nature referred to above are not capable of regulating the movement of the soot and are expensive and undergo considerable wear while dirt tends to accumulate in the rotary valves. These conditions make it difficult to insure a uniform delivery of soot.

The difficulty of regulating the movement of loose soot appears to be due to the extremely low density of the soot and devices such as rotating bodies and radio-active substances which have been found suitable for use with other granular materials are not practical for controlling the movement and delivery of soot.

The present invention is particularly concerned with the provision of a novel apparatus particularly useful with soot and by means of which accurate control of the soot can be achieved continuously and automatically during operation.

The present invention is based on the use of the electrical conductivity of the soot in relation to its degree of compression, but does not depend on the difficult measurements that would be required for measuring differences of conductivity between a gas and a powdered substance.

Furthermore the present invention by continuous automatic regulation or control of the delivery of the soot avoids the necessity of making successive measurements and delivering a plurality of successive signals to the control devices.

An installation of this nature would generally require measuring electrodes in the gaseous space where the electrodes would accumulate incrustations produced by high temperature gases. An installation of that nature is also quite expensive.

Electrical devices of this kind are also known which employ a single electrode extending across the entire region to be regulated and are equal in height to the container. An electrode of this nature would also be subject to incrustation in at least the upper region thereof which would eventually make the electrode inoperative.

According to the present invention, the advantages of electrical conductivity methods are retained while the disadvantages referred to above are eliminated by making use of the electrical conductivity of only the soot and measuring this conductivity by an electrode positioned below the upper level of the soot and connected in controlling relation to a regulator that controls the delivery of the soot from the container in which the electrode is positioned.

In this manner it is possible to overcome the above difficulties and to achieve with a single conductivity measurement a satisfactory, steady and continuous regulation and control of soot delivery from the container by carrying out a single conductivity measurement of the soot entirely beneath the level thereof.

It appears that soot in a container operates somewhat in the manner of a carbon pile rheostat. The conductivity of the soot increases as the height of the column of soot above the point of measurement increases, and this apparently comes about because of the increased pressure on the soot which presses the particles into more intimate contact with one another, thereby increasing the electrical conductivity of the soot.

It has been found that by positioning the conductivity measuring electrode in the container between 0.10 and 0.50 meter below the free surface of the soot satisfactory results throughout a large range of values are obtained.

Furthermore, by positioning a plate-like electrode parallel to the direction of movement of the soot, the electrode means will offer a minimum of resistance to movement of the soot.

With the foregoing in mind, it will be apparent that a primary object of the invention is the provision of a relatively simple, inexpensive but highly reliable apparatus for controlling soot movement from a container.

A still further object of the present invention is the provision of an apparatus of the nature referred to which is so constructed and designed as to be substantially free from incrustation.

A still further object of this invention is the provision of a device for controlling the movement of soot from a container in which the electrical conductivity of the soot, measured continuously and at a single point, serves as the sole and continuous control of the delivery of the soot from the container.

These and other objects and advantages of this invention will become more apparent upon reference to the following specification taken in connection with the accompanying drawings, in which:

FIGURE 1 is a somewhat schematic view showing a bunker containing soot and a delivery conduit leading from the bottom of the bunker and with a control apparatus according to the present invention extending into the bunker;

FIGURE 2 is a somewhat enlarged fragmentary view showing in detail how the electrode is positioned within the soot in the container;

FIGURE 3 is a graph showing the variation in conductivity of the soot at the level of the electrode as the height of the soot above the electrode varies; and FIGURE 4 is a view similar to FIGURE 1 but showing a somewhat different installation and also illustrating more in detail the manner in which the discharge of soot from the container is controlled.

In general, the present invention is practiced by positioning an electrode beneath the surface of the soot in the container and utilizing the variation in conductivity of the soot in the region of the electrode with varying amounts of soot in the container to continuously and automatically control the rate of discharge of soot from the container. The conductivity of the soot is measured by impressing a voltage upon the electrode and measuring the current flow which takes place.

By positioning the electrode beneath the surface of the soot, the electrode is protected against contamination from the gaseous space above the soot. This is an important advantage of the process of this invention when used for soot separation from cracked gases and also for the production of carbon black from hydrocarbons. Since it is possible now to perform the complete regulation and/or control with only a single measurement by making use of the entire vertical height of the soot, or if desired over the entire volume of the bunker, the system will be able to operate very economically. Another important advantage is that it will be possible to provide alarm signals anywhere in the measured range, at either high or low levels, without much additional expense.

Since the soot level measurements are performed by a single conductivity measuring electrode, the soot movement into and out of the container can be regulated and controlled by a single control member. The admission and discharge of the flowable soot is accomplished by a variable size passageway.

Preferably one or more of such variable openings controlled by a regulating or adjusting member are arranged at the bottom of the soot container. It is, however, also possible to use an opening of definite size for the discharge of soot and to regulate the flow thereof from a conduit or another container or apparatus whose entrance opening is capable of being regulated.

It has been found that the cross-section of the inlet or outlet passageway for the soot can be regulated in an especially advantageous manner by connecting the conductivity measuring electrode through a regulating and driving mechanism with a cylindrical valve rotating on a horizontal axis to control the admission or discharge of soot to or from the container. The axis of rotation is below the discharge opening. The rotary valve is controlled e.g. by a pneumatic control cylinder. Such a device permits continual variation of the cross-section of the passageway, permitting the latter to be closed at approximately the level of the bottom of the soot container and thereby avoiding any abrupt corners which would cause trouble on account of bridge formation. The rotary valve which is spaced from its housing by an air space of 0.1 mm. is practically soot-tight and very nearly frictionless so as to require only weak regulating forces, such valves having no tendency to bind with any kind of soot.

It may also be advantageous to keep the discharged soot in continual agitation, as by rotary vanes or vibrators to prevent bridge formations or occlusions. The operativeness of the invention here claimed does not, however, depend on the use of such devices.

This new apparatus solves all the problems of separation, dispensing, conveying and sealing during the treatment of soot in industrial establishments in the simplest possible manner whereby even complicated discharging and delivering systems can be operated in unison therewith and with arbitrarily chosen pressure levels.

In the drawings, in FIGURES 1 and 2 there is shown a bunker 1 within which is positioned an electrode device 2 for measuring the conductivity of the soot in the container. Electrode device 2 comprises a first plate-like electrode 3' which may be a blade or plate of stainless steel having the dimensions of about 1 mm. by 60 mm. by 230 mm. and which electrode is supported by an insulating member 4' on a stainless steel support tube 5' which forms the second electrode. It is estimated the gas pressure within the bunker might be on the order of about 0.025 atmosphere and under these conditions the conductivity of the soot between the electrodes is measured.

FIGURE 3 also shows how the conductivity of the soot varies with the height of the soot in the container.

In FIGURE 3, the point A represents a normal soot level of 1 meter and the conductivity of the soot at the level of the electrode is $1.47 \times 10^{-2}$ $\Omega^{-1}$. At point B, the soot level is 2 meters and the conductivity measured at the electrode is $3.13 \times 10^{-2}$ $\Omega^{-1}$ and this is taken as the high signal. Point C represents a soot level of $0.5 \times 10^{-2}$ $\Omega^{-1}$ and this is considered as the low signal.

The aforementioned soot levels are measured as heights of the soot column above the electrode and it will be seen that the electrode device is always located beneath the upper level of the soot in the container.

FIGURE 4 shows a somewhat different installation from that of FIGURE 1, while still operating on the same principle.

From cracked gas at 200° C. in a cyclone 9 in FIGURE 4, soot is discharged into a container 1 of 2 m. height which forms a gas tight seal between the cyclone and the soot discharge conduit 8. In the middle of the container, 1 m. above the bottom, an electrode 3 of stainless steel is shown introduced from the side. The conductivity of the soot is measured between the 0.3 m.² electrode 3 and the outer wall of container 1. In the lower part of the cylindrical container there is a pneumatically actuated pivoted modulating valve 4 with an upper closely fitted but non-contacting cylindrical sealing surface and which is under continuous regulation by pneumatic cylinder 5.

The regulating cylinder 5, which may be pneumatically operable, is continuously under the control of a regulator 5a which may consist of a valve connected between cylinder 5 and a source of pressure 5b. An operator 5c for the valve is electrically connected with an amplifier 5d which is connected in circuit between the aforementioned electrode 3 and the side wall of container 1. The soot control valve member 4 is thereby adjusted continuously to maintain the level of the soot in the container substantially constant.

The control valves are adjusted modulating in such a manner that the measuring electrode 3 will always remain below the level of the soot. If the soot reaches a level of 1 m. above the electrode a high signal is given, whereas if the height is only 0.2 m. above the electrode a low signal is given which latter will cause the electrically controlled valve 7 below the valve 4 to be closed.

For the last mentioned purpose control valve 7 has an operator 7a electrically connected to amplifier 5d to receive a signal therefrom. Operator 7a will close valve 7 when the signal from amplifier 5d indicates a predetermined minimum level of soot of container 1.

The normal level of the soot is 0.5 m. above the electrode 3. In that manner with a soot level of 1.5 m. over the pivoted valve 4, the gaseous communication with the soot discharge conduit 8 is shut off. Above the pivoted valve 4 is a rotary shaft with inclined agitating blades 6 to assist the movement of the soot toward the pivoted valve. The adjacent surfaces of valve 4 are closely fitted with a spacing of 0.10 mm. so as to be impervious to soot, but will permit the valve 4 to be regulated with only very little friction and also permit close approach of the agitator 6 to the valve 4 so as to prevent bridge formation, even after long standing. The difference of gaseous pressure between the gaseous space above and the soot-discharge conduit 8 is about 0.05 atmosphere.

After about 1000 hours of operation the upper portions of the walls of container 1 are covered with a layer of soot containing polymer several mm. thick. The electrodes below the free surface of the soot, however, show no such deposit but remain bright and metallic.

From an apparatus like that of FIGURE 1, soot from a 50 m.³ bunker 1, whose gaseous space is filled with hydrocarbons, is deposited in conduit 8 for delivery by compressed air. The soot level is 3 m. above the discharge opening. The gaseous pressure difference between the space inside the bunker 1 and conduit 8 is 0.04 atmosphere. With an apparent specific gravity of 40 g./l., 1 kg. soot will normally carry along with it about 24 l. gaseous hydrocarbons. By gas analysis of the air in the conduit it is found that together with this 1 kg. of soot, only 2.2 N liters gaseous hydrocarbons reach the air in the conduit. A comparison of the measured amount of gaseous hydrocarbon in the air of the conduit 8 with the calculated amount shows that only a fraction of the gaseous hydrocarbons which were carried along by the soot have been given off to the air in the conduit.

From the foregoing, it will be seen that the present invention provides a relatively simple, inexpensive apparatus which is highly reliable and accurate for effecting continuous control of the discharge of soot from a container and even under circumstances where there is only an extremely small pressure drop between the container and a discharge conduit to which the soot is delivered.

It will be understood that this invention is susceptible to modification in order to adapt it to different usages and conditions; and accordingly, it is desired to comprehend such modifications within this invention as may fall within the scope of the appended claims.

What is claimed is:

1. The method of regulating soot flow from the discharge opening at the bottom of a container having soot supplied thereto at the top which comprises; measuring the electrical conductivity of the soot at a predetermined level in the container which is beneath the normal level of the soot in the container, and modulatingly varying the rate of soot flow through said opening in response to the varying electrical conductivity to maintain the level of the soot therein substantially constant.

2. The method according to claim 1 in which the said measuring is continuous and the said varying of the rate of soot flow is also continuous and takes place simultaneously with changes in the said electrical conductivity of the soot as determined by said measuring.

3. An apparatus for continuously and automatically regulating the height of soot in a container while soot is being delivered into the container, said apparatus comprising an electrode mounted in a fixed position in the container for contacting the soot, a modulating valve at the bottom of the container for continuously regulating the discharge of soot from the container, and electrically actuated means for connecting the electrode with the valve and responsive to the electric conductivity of the soot in the neighborhood of the electrode for automatically and modulatingly controlling the position of the valve in accordance with the depth of the electrode in the soot.

4. The apparatus of claim 3, in which the electrode is in the form of a plate that is positioned vertically so as to offer a minimum of resistance to the downward flow of soot in the container.

5. The apparatus of claim 3, in combination with an agitator positioned near the bottom of the container immediately above the valve and below the electrode for agitating the downwardly moving soot.

6. The apparatus of claim 3, in combination with another valve in series with the first valve and another electrically actuated means connected to the second valve for closing the latter when the level of the soot falls below a minimum height.

References Cited by the Examiner

UNITED STATES PATENTS

| 2,774,959 | 12/1956 | Edelman et al. | |
| 2,776,725 | 1/1957 | Wood | 200—61.21 X |
| 3,036,736 | 5/1962 | Murphy et al. | 222—56 X |
| 3,198,386 | 9/1965 | Hartley | 222—56 X |

ROBERT B. REEVES, *Primary Examiner.*

HADD S. LANE, *Examiner.*